(12) United States Patent
Ellis et al.

(10) Patent No.: US 6,241,952 B1
(45) Date of Patent: Jun. 5, 2001

(54) COUNTERCURRENT REACTOR WITH INTERSTAGE STRIPPING OF $NH_3$ AND $H_2S$ IN GAS/LIQUID CONTACTING ZONES

(75) Inventors: Edward S. Ellis, Basking Ridge; Ramesh Gupta, Berkeley Heights, both of NJ (US)

(73) Assignee: Exxon Research and Engineering Company, Annandale, NJ (US)

( * ) Notice: Subject to any disclaimer, the term of this patent is extended or adjusted under 35 U.S.C. 154(b) by 0 days.

(21) Appl. No.: 09/373,255

(22) Filed: Aug. 12, 1999

Related U.S. Application Data

(63) Continuation-in-part of application No. 08/939,021, filed on Sep. 26, 1997, now abandoned.

(51) Int. Cl.[7] ................ B01J 8/04; B01J 10/00
(52) U.S. Cl. ............. 422/192; 422/188; 422/220
(58) Field of Search .................. 422/177, 191, 422/194–196, 111, 112, 220; 202/158, 163, 232; 208/142, 143; 261/146, 147, 148; 203/29

(56) References Cited

U.S. PATENT DOCUMENTS

| | | | |
|---|---|---|---|
| 2,952,626 | 9/1960 | Kelley et al. | 208/210 |
| 2,971,754 | 2/1961 | Seyfried | 266/5 |
| 2,987,467 | 6/1961 | Keith et al. | 208/97 |
| 3,017,345 | 1/1962 | Eastman et al. | 208/210 |
| 3,091,586 | 5/1963 | Pappas et al. | 208/210 |
| 3,124,526 | 3/1964 | Butler et al. | 208/264 |
| 3,147,210 | 9/1964 | Hass et al. | 208/210 |
| 3,211,641 | 10/1965 | Halik et al. | 208/59 |
| 3,228,871 | 1/1966 | Schlinger et al. | 208/58 |
| 3,268,438 | 8/1966 | Scott, Jr. et al. | 208/89 |
| 3,413,216 | 11/1968 | Doumani | 208/216 |
| 3,415,737 | 12/1968 | Kluksdahl | 208/139 |

(List continued on next page.)

FOREIGN PATENT DOCUMENTS

| | | | |
|---|---|---|---|
| 2935191 A1 | 4/1981 | (DE) | C10G/45/00 |
| 1323257 | 7/1973 | (GB) | C10G/13/24 |
| 2016617 | 7/1994 | (RU) | B01D/1/00 |

Primary Examiner—Marian C. Knode
Assistant Examiner—Alexa A. Doroshenk
(74) Attorney, Agent, or Firm—Gerard J. Hughes

(57) ABSTRACT

A reactor for reacting liquid petroleum or chemical streams wherein the liquid stream flows countercurrent to the flow of a treat gas, such as a hydrogen-containing gas. The reactor is comprised of at least one vertically disposed reaction zone, each containing a bed of catalyst, wherein each reaction zone may contain vapor bypass means, and wherein each reaction zone is immediately preceded by a non-reaction zone, and wherein each non-reaction zone contains a gas/liquid contacting zone for stripping gaseous by-products, such as $NH_3$ and $H_2S$, from the liquid stream.

9 Claims, 1 Drawing Sheet

U.S. PATENT DOCUMENTS

| | | | |
|---|---|---|---|
| 3,425,810 | 2/1969 | Scott, Jr. | 23/289 |
| 3,450,784 | 6/1969 | Reilly et al. | 260/667 |
| 3,461,063 | 8/1969 | Stine et al. | 208/143 |
| 3,595,779 | 7/1971 | Peck et al. | 208/210 |
| 3,607,723 | 9/1971 | Peck et al. | 208/59 |
| 3,658,681 | 4/1972 | Wilson et al. | 208/211 |
| 3,671,420 | 6/1972 | Wilson et al. | 208/61 |
| 3,673,078 | 6/1972 | Kirk, Jr. | 208/89 |
| 3,714,030 | 1/1973 | Winsor et al. | 208/210 |
| 3,767,562 | 10/1973 | Sze et al. | 208/57 |
| 3,775,291 | 11/1973 | Sze | 208/57 |
| 3,788,976 | 1/1974 | Kirk, Jr. | 208/89 |
| 3,843,508 | 10/1974 | Wilson et al. | 208/89 |
| 3,846,278 | 11/1974 | Sze et al. | 208/57 |
| 3,897,329 | 7/1975 | Franz et al. | 208/210 |
| 3,905,893 | 9/1975 | Christman et al. | 208/210 |
| 4,021,330 | 5/1977 | Satchell, Jr. | 208/89 |
| 4,022,682 | 5/1977 | Bludis et al. | 208/89 |
| 4,026,674 | 5/1977 | McDonald | 23/283 |
| 4,194,964 | 3/1980 | Chen et al. | 208/108 |
| 4,212,726 | 7/1980 | Mayes | 208/101 |
| 4,213,847 | 7/1980 | Chen et al. | 208/111 |
| 4,243,519 | 1/1981 | Schorfheide | 208/210 |
| 4,457,834 | 7/1984 | Caspers et al. | 208/143 |
| 4,476,069 | 10/1984 | Harper et al. | 261/97 |
| 4,526,757 | 7/1985 | Gupta | 422/106 |
| 4,591,426 | 5/1986 | Krasuk et al. | 208/96 |
| 4,599,162 | 7/1986 | Yen | 208/59 |
| 4,624,748 | 11/1986 | Haunschild | 203/29 |
| 4,755,281 | 7/1988 | Penick | 208/108 |
| 4,801,373 | 1/1989 | Corman et al. | 208/210 |
| 4,952,306 | 8/1990 | Sawyer et al. | 208/216 |
| 5,026,459 | 6/1991 | Quang et al. | 202/158 |
| 5,082,551 | 1/1992 | Reynolds et al. | 208/100 |
| 5,183,556 | 2/1993 | Reilly et al. | 208/57 |
| 5,252,198 | 10/1993 | Harrison et al. | 208/208 R |
| 5,262,044 | 11/1993 | Huizinga et al. | 208/107 |
| 5,292,428 | 3/1994 | Harrison et al. | 208/208 R |
| 5,348,641 | 9/1994 | Shih | 208/89 |
| 5,366,614 | 11/1994 | Russ et al. | 208/65 |
| 5,378,348 | 1/1995 | Davis et al. | 208/27 |
| 5,449,501 | 9/1995 | Luebke et al. | 422/193 |
| 5,518,607 | 5/1996 | Field et al. | 208/212 |
| 5,522,198 | 6/1996 | Byer et al. | 52/741.3 |
| 5,522,983 | 6/1996 | Cash et al. | 208/59 |
| 5,670,116 | 9/1997 | Gupta et al. | 422/191 |
| 5,705,052 | 1/1998 | Gupta | 208/57 |
| 5,720,872 | 2/1998 | Gupta | 208/57 |
| 5,779,992 | 7/1998 | Higashi | 422/190 |
| 5,882,505 | 3/1999 | Wittenbrink et al. | 208/59 |
| 5,888,376 | 3/1999 | Wittenbrink et al. | 208/59 |
| 5,888,377 | 3/1999 | Bertram | 208/59 |
| 5,906,728 | 5/1999 | Iaccino et al. | 208/61 |
| 5,925,235 | 7/1999 | Habib | 208/111.35 |
| 5,939,031 | 8/1999 | Ellis et al. | 422/191 |
| 5,942,197 | 8/1999 | Gupta et al. | 422/191 |
| 5,985,131 | 11/1999 | Gupta et al. | 208/57 |
| 6,007,787 | 12/1999 | Gupta et al. | 422/191 |

COUNTERCURRENT REACTOR WITH INTERSTAGE STRIPPING OF NH₃ AND H₂S IN GAS/LIQUID CONTACTING ZONES

CROSS REFERENCE TO RELATED APPLICATIONS

This is a continuation-in-part of U.S. Ser. No. 08/939,021 filed Sep. 26, 1997 now abandoned.

FIELD OF THE INVENTION

The present invention relates to a reactor for reacting liquid petroleum or chemical streams wherein the liquid stream flows countercurrent to the flow of a treat gas, such as a hydrogen-containing gas. The reactor. is comprised of at least one vertically disposed reaction zone, each containing a bed of catalyst, wherein each reaction zone may contain vapor bypass means, and wherein each reaction zone is immediately preceded by a non-reaction zone, and wherein each non-reaction zone contains a gas/liquid contacting zone for stripping gaseous by-products, such as $NH_3$ and $H_2S$, from the liquid stream.

BACKGROUND OF THE INVENTION

There is a continuing need in the petroleum refining and chemical industries for improved catalysts and process technology. One such process technology, hydroprocessing, has been subjected to increasing demands for improved heteroatom removal, aromatic saturation, and boiling point reduction. More active catalysts and improved reaction vessel designs are needed to meet this demand. Countercurrent reactors have the potential of helping to meet these demands because they offer certain advantages over co-current flow reactors. Countercurrent hydroprocessing is known, but of very limited commercial use. A countercurrent process is disclosed in U.S Pat. No. 3,147,210 which teaches a two-stage process for the hydroprocessing-hydrogenation of high boiling aromatic hydrocarbons. The feedstock is first subjected to catalytic hydroprocessing, preferably in co-current flow with hydrogen. It is then subjected to hydrogenation over a sulfur-sensitive noble metal hydrogenation catalyst countercurrent to the flow of a hydrogen-rich gas. U.S. Pat. Nos. 3,767,562 and 3,775,291 disclose a similar process for producing jet fuels, except the jet fuel is first hydrodesulfurized prior to two-stage hydrogenation. U.S. Pat. No. 5,183,556 also discloses a two-stage concurrent-countercurrent process for hydrofing—hydrogenating aromatics in a diesel fuel stream.

An apparatus is disclosed in U.S. Pat. No. 5,449,501 that is designed for catalytic distillation. The distillation apparatus, which is a vessel, contains vapor passageways which provide a means for vapor communication between fractionation sections located above and below catalyst beds. Substantially all of the vapor in the vessel rises through the vapor passageways and the desired contacting between vapor and liquid occurs in the fractionation sections.

While the concept of countercurrent hydroprocessing has been known for some time, the use of countercurrent flow reaction vessels in commercial operations were avoided, primarily because conventional countercurrent reaction vessels are susceptible to catalyst bed flooding. That is, the relatively high velocity of the upflowing treat gas prevents the downward flow of liquid. The liquid thus cannot pass through the catalyst bed. While flooding is undesirable, catalyst contacting by the reactant liquid improves as the bed approaches a flooded condition. However, operating close to the point of incipient flooding leaves the process vulnerable to fluctuations in pressure or temperature as well as in liquid or gas flow rates. This could result in a disturbance large enough to initiate flooding, and process unit shutdown in order to recover stable operation. Such disruptions are highly undesirable in a continuous commercial operation.

Reaction vessels have been disclosed in co-pending U.S. patent applications Ser. No. 08/855,699, now U.S. Pat. No. 5,939,031; and 08/885,788 now U.S. Pat. No. 5,942,197; both entitled "Countercurrent Reactor", and both filed Jun. 30, 1997, and both of which are incorporated herein by reference. These two co-pending applications disclose countercurrent reactors which are less susceptible to flooding than conventional countercurrent reaction vessels. This is primarily due to the novel use of vapor passageways which act to selectively bypass a fraction of the upward-flowing treat gas through one or more of the catalyst beds.

While bypass tubes provide a great improvement in countercurrent reactors, there is still a need in the art for further improvement, particularly for improving the liquid flow rate through the reaction beds of a countercurrent reactor. There also exists a need for improved countercurrent reaction vessel designs which are not as readily susceptible to flooding, or which can more easily recover without shutdown should flooding occur.

SUMMARY OF THE INVENTION

In accordance with the present invention, there is provided a reactor for reacting liquid petroleum and chemical streams with a hydrogen-containing treat gas in the presence of a catalyst in at least one countercurrent reaction zone, which reactor comprises:

(a) a continuous wall enclosing a first reaction zone, wherein said first reaction zone includes a bed of catalyst for causing the desired reaction between said liquid stream and said treat gas, and wherein there is a non-reaction zone immediately upstream of said first reaction zone;

(b) a gas-liquid contacting zone within each of said non-reaction zones, which gas-liquid contacting zone contains a contacting means comprised of open-structure solid material;

(c) liquid inlet means above said non-reaction zone of said first reaction zone for allowing an unreacted portion of said liquid stream to enter said reactor;

(d) gas inlet means below said first reaction zone for allowing an unreacted portion of treat gas to enter the reactor;

(e) liquid outlet means below said first reaction zone for allowing a reacted portion of said liquid stream to exit said reactor;

(f) gas outlet means above said non-reaction zone of said first reaction zone for allowing a portion of said treat gas to exit said reactor; and (g) gas bypass means in said first reaction zone for allowing a portion of the treat gas to bypass said first reaction zone.

In a preferred embodiment of the present invention, the reaction vessel contains a plurality of said reaction zones and wherein there is a non-reaction zone immediately upstream of each reaction zone and wherein each non-reaction zone contains a gas-liquid contacting zone containing a contacting means.

In another preferred embodiment of the present invention substantially all of the treat gas by-passes as least one reaction zone.

In another preferred embodiment of the present invention, the reaction vessel contains a plurality of said reaction zones and said vapor bypass means are such that they allow treat gas to by pass all of said reaction zones with fresh treat gas introduced below each said reaction zone, or below each said contacting zone.

In still another preferred embodiment of the present invention, the contacting means is comprised of open-structure solid material selected from Raschig rings, Intalox saddles, Pall rings, Berl saddles, Cyclohelix spiral rings, Lessing rings, and Cross-partition rings.

In yet another embodiment of the present invention at least one of the vapor passageways is external to the reaction vessel.

DETAILED DESCRIPTION OF THE INVENTION

Figure 1:
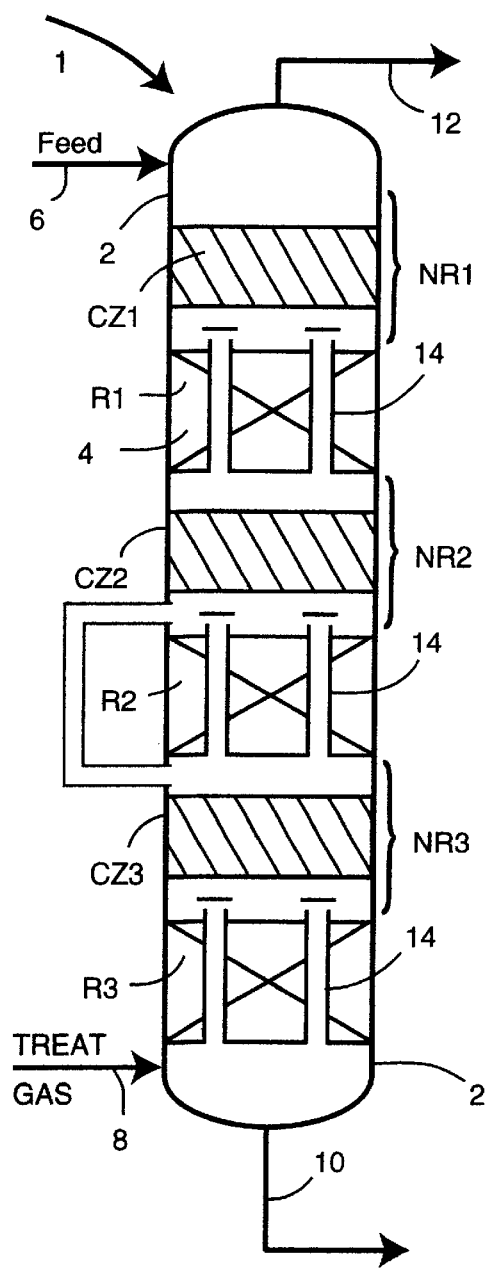
FIG. 1 hereof is one embodiment of the present invention which shows a reactor having three reaction zones, each of which contains vapor bypass tubes so that a portion of the upflowing vapor can bypass the reaction zones, and contact downflowing liquid in the gas/liquid contacting zones upstream of each reaction zone.

The reactors of the present invention are suitable for use in any petroleum or chemical process wherein it is advantageous to pass a gas, such as a hydrogen-containing treat gas, countercurrent to the flow of liquid feedstock. Non-limiting examples of refinery processes in which the instant reaction vessels can be employed include the hydroconversion of heavy petroleum feedstocks to lower boiling products; the hydrocracking of distillate boiling range feedstocks; the hydrotreating of various petroleum feedstocks to remove heteroatoms, such as sulfur, nitrogen, and oxygen; the hydrogenation of aromatics; and the hydroisomerization and/or catalytic dewaxing of waxes, particularly Fischer-Tropsch waxes. It is preferred that the reaction vessels of the present invention be those in which a hydrocarbon feedstock is hydrotreated and hydrogenated, more specifically when heteroatoms are removed and when at least a portion of the aromatic fraction of the feed is hydrogenated.

In countercurrent processing, the treat gas, which typically flows upward through the bed of catalyst comprising a reaction zone, hinders the downward movement of the liquid. At low liquid and gas velocities, the hindrance from the upward moving gas is not enough to cause flooding and the liquid in the reaction vessel is able to drain through the catalyst bed or beds. However, if either the upflowing gas rate, or the downflowing liquid rate is too high, liquid cannot drain through the catalyst bed. This is known as "flooding." The liquid holdup in the catalyst bed increases and liquid may begin to accumulate above the top surface of the catalyst bed. The upflowing gas rate at which flooding occurs in a given bed will depend on such things as the rate and physical properties of the downflowing liquid. Similarly, the downflowing liquid rate at which flooding occurs in a given bed similarly depends on the rate and properties of upflowing gas.

The fraction of upflowing treat gas that bypasses a catalyst bed increases as vapor pressure drop increases through the catalyst bed. Thus, reactors with vapor passageways provide a somewhat self-adjusting regulation of upward-flowing vapor, thereby extending the hydrodynamic operating window of the reaction vessel. Further extension of this range can be provided by including one or more external vapor passageways with flow control means. Such a system provides a means by which catalyst bed pressure drop, and therefore catalyst contacting efficiency, can be controlled. Preferably, when both internal and external vapor passageways are provided, the external vapor passageways can be controlled with a control means, preferably a valve for so-called "trim" bypassing. The valve, of course, can be automatically controlled so that it opens and closes to the appropriate degree in response to a signal transmitted in response to pressure drop changes in the catalyst bed(s). That is, the trim bypass will be used to keep the reaction vessel operating as close to flooding as desirable. Treat gas which bypasses a particular catalyst bed or beds may pass through the other catalyst bed(s) and serve to take part in the desired hydroprocessing reactions, carry away light or vaporized reaction products, strip catalyst poisons such as hydrogen sulfide, water and/or ammonia, etc. The gas bypassing may also be self regulated using the invention described in co-pending U.S. patent application Ser. No. 08/885,788 filed on Jun. 30, 1997.

Thus, the vapor passageways provide an extended operating range and an opportunity to operate close to the flooding point of the reaction vessel. This enables a more stable, more efficient reaction vessel operating regime. Further, the reaction vessel can safely and continuously operate while responding to normal process fluctuations in liquid and vapor flow rate and temperature. The range of total flow rates that can be tolerated is thereby extended. Operating close to the flooding point results in relatively efficient contacting because the catalyst particles are well irrigated by the downflowing liquid. In the absence of vapor passageways, a conventional countercurrent reaction vessel would need to operate at lower efficiency in order to remain operable.

Unless otherwise stated herein, the terms "downstream" and "upstream" are with respect to the flow of liquid which will typically flow downward.

As previously stated, the reaction vessels of the present invention provide vapor bypass means such that substantially all of the treat gas from a downstream (with respect to the flow of liquid) gas-liquid contacting zone can bypass the catalyst beds of the reaction zones without a significant decrease in reaction activity or selectivity. In such a case, a preferred feedstock can be used which contains enough dissolved hydrogen to satisfy demand for hydrogen in the catalyst bed, such that substantially all of the treat gas can be made to by-pass at least one of the reaction zones. This allows for substantially greater liquid flow rates through reaction zones, when compared to other countercurrent reactors. This is accomplished by providing a gas/liquid contacting zone immediately before and immediately after each reaction zone. The gas/liquid contacting zone contains suitable gas/liquid contacting material and greatly enhances the removal of undesirable reaction products, such as $NH_3$ and $H_2S$ from the downflowing feed stream, while providing the desired saturation of the liquid with dissolved treat gas components, such as hydrogen.

It should be understood that the primary function of the open structure packing is to facilitate the stripping of $H_2S$ and $NH_3$ from the downflowing liquid. While the open structure packing material will generally have very little or no catalytic activity, it should be understood that the same catalytic activity can also be imparted to the open structure material. In other words, the contacting zone may also use material having catalytic activity.

Figure 2:
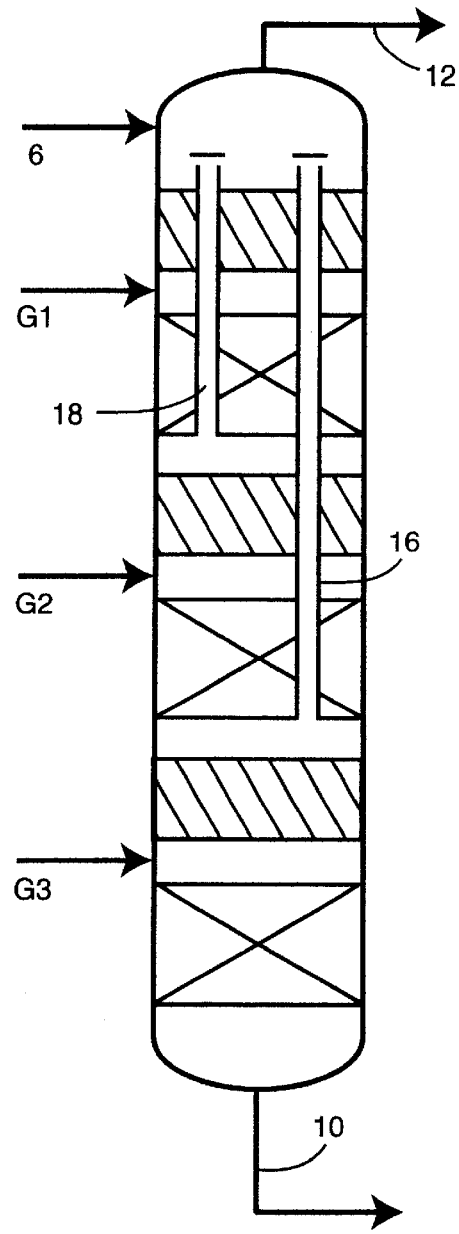
FIG. 2 is a representation of another embodiment of the reactor of the present invention wherein treat gas and gaseous impurities from the liquid stream are passed directly to the gas outlet of the reactor. Also shown is fresh treat gas being introduced downstream (with respect to the flow of liquid) of each gas/liquid contacting zone.

The present invention can be better understood by a description of the two reaction vessels shown in FIGS. 1 and 2 hereof. Miscellaneous reaction vessel internals, such as flow distributor means, thermocouples, heat transfer devices etc. are not shown in the figures for simplicity. FIG. 1 shows reactor 1 which is generally comprised of a continuous wall 2 which encloses at least one reaction zone R1 having a catalyst bed 4 suitable for causing a desired reaction between a liquid feedstock and a treat gas. Although three such reaction zones R1, R2, and R3 are shown serially disposed in the reactor of FIG. 1, the number of reaction zones will depend upon the particular needs of the reaction, as will be explained further herein. Each reaction zone contains a bed of catalyst and is immediately preceded by a non-reaction zone NR1, NR2, NR3. Each non-reaction zone contains a gas/liquid contacting zone CZ1, CZ2, CZ3, which contains an effective gas-liquid contacting means. The term "effective gas-liquid contacting means", as used herein, means a solid material having an effective surface area that will allow enough gas/liquid contacting to strip at least about 90 wt. %, preferably at least about 95 wt. %, of the trapped gases from the liquid stream. Preferred solid materials that can be used in the gas-liquid contacting zone are open structured materials. The stripped gases will typically be undesirable reaction products, such as $NH_3$ and $H_2S$, which are produced while the feedstream is reacted in the reaction zones. By the term "open-structured", we mean that there is enough space either between or within the solid material so that the downflow of liquid is not significantly impeded. Of course, the precise amount and size of the open-structure material must be balanced so that adequate surface area is provided for stripping and the flow of the liquid stream is not substantially reduced. Non-limiting examples of gas-liquid contacting structures suitable for use in the reactors of the present invention include metallic and ceramic trays, as well as conventional packing shapes, such as Raschig rings, Intalox saddles, Pall rings, Berl saddles, Cyclohelix spiral rings, Lessing rings, Cross-partition rings, and the like. These open-structures, which also include trays, provide adequate surface area for gas/liquid contact and the removal of the desired amount of gases from the downflowing liquid stream. In a preferred embodiment, the downflowing liquid stream will still contain enough dissolved hydrogen after being stripped in an upstream gas/liquid contacting zone to enable the desired hydroprocessing reaction to occur. That is, a reaction wherein the consumption of hydrogen in the reaction zone is less than the amount dissolved in the incoming liquid. Thus, substantially all of the treat gas can be made to by-pass at least one of the reaction zones. If the dissolved hydrogen in the liquid is not enough to meet the hydrogen demand due to the reaction, then all of the treat gas may not bypass the reaction zone.

Liquid inlet means 6 is located near the top of the reactor 1 and allows a liquid feed such as a feedstock to be treated, to enter the reactor 1. Gas inlet means 8 is located near the bottom of reactor 1 and allows treat gas to enter the reactor 1. Liquid outlet means 10 is located near the bottom of the reactor 1 and allows the reacted liquid stream to exit as a reaction product. Analogously, gas outlet means 12 is located near the top of the reactor 1 and allows treat gas to exit the reactor.

As shown in FIG. 1 herein, gas bypass means 14, of sufficient size, are disposed through each reaction zone to enable treat gas to bypass at least one reaction zone. In a preferred embodiment, the gas bypass means are comprised of one or more gas bypass tubes. Each gas bypass tube enables fluidic communication of the treat gas between two separate nonreaction zones.

FIG. 2 hereof shows an alternative embodiment of the reaction vessels of the present invention. The reactor of this FIG. 2 is similar to that of FIG. 1 except that: (a) a portion of the fresh treat gas is introduced prior to each reaction zone at G1, G2, G3; and (b) all treat gas, after passing through a gas/liquid contacting zone exits the reactor thereby bypassing more than one reaction zone, non-reaction zones, and downstream (with respect to the flow of treat gas) gas-liquid contacting zones through bypass tubes 16 and 18. All other features of the reactor of FIG. 2 are identical to that of FIG. 1 hereof, and thus need not be shown.

The reaction vessels used in the practice of the present invention are operated at suitable temperatures and pressures for the desired reaction. For example, typical hydroprocessing temperatures will range from about 40° C. to about 450° C. at pressures from about 50 psig to about 3,000 psig., preferably 50 to 2,500 psig. With regard to FIG. 1 hereof, the liquid feedstock enters the reactor via line 6 and passes downward through gas/liquid contacting zone CZ1 wherein at least a portion of any dissolved gases are separated from the feedstock and exit the reactor via line 12 with any unreacted treat gas and gaseous reaction products from downstream reaction zones. The feedstream then passes through the catalyst bed of reaction zone R1 where it reacts with dissolved hydrogen on the catalyst surface. The reacted liquid stream, and any dissolved vapor-phase reaction products, are passed downward to non-reaction zone NR2 which contacts upflowing treat gas in gas/liquid contacting zone CZ2. At least a portion of the separated gases which now become part of the upflowing treat gas stream, flow upward through bypass tubes 14 avoiding contact with the catalyst of reaction zone R1, and into non-reaction zone NR1 where they contact the downflowing fresh feed stream in gas/liquid contacting zone CZ1 where any undesirable gases from upstream processing of the stream are stripped. As previously mentioned, the undesirable gases and treat gas then exit the reactor at gas outlet 12. This flow scheme is repeated as the reacted feed stream flows to downstream reaction zones and non-reaction zones.

It will be understood that the terms "vapor bypass means", "vapor passageways", "vapor passageway means" "vapor bypass tubes" and "gas bypass means" are used interchangeably herein. The vapor bypass tubes used in the practice of the present invention may be comprised of any material that can withstand the operating conditions of the reactor. Suitable materials include metals, such as stainless and carbon steels; ceramic materials; as well as high performance composite materials such as carbon fiber materials. Preferred are tubular passageways having round cross sections. The tubes need not be perfectly vertical. That is, they can be inclined or curved, or even in the form of a spiral. It is to be understood that the passageways can be of any suitable size depending on the amount and rate of vapor one wishes to bypass from one non-reaction zone to another. Further, one or more of the bypass tubes can have a flat substantially horizontal member, such as a baffle, above it to prevent liquid from an upstream bed from falling into the passageways. Also, more than one bypass tube can be extended through any given reaction zone to enable substantially all of the treat gas to bypass that reaction zone. When a plurality of bypass tubes are used, it is preferred that they be concentrically located about the vertical axis of the reactor. One or more vapor bypass tubes can also be routed external to the reaction zone. For example, a tubular arrangement can be used on the outside of the reaction vessel so that one or more non-reaction zones are in fluid communication with any one or more other non-reaction zones. The vapor bypass tubes may contain a flow control means to control the portion of vapors which is passed from one non-reaction zone to another non-reaction zone. If the vapor bypass tubes are external to the reaction vessel, then it is preferred that the flow control means be simply a flow control valve.

It is within the scope of the present invention that the vapor passageways bypass two or more catalyst beds, or reaction zones, as shown in FIG. 2 hereof. Further, the vapor passageways need not be hollow structures, such as solid-walled tubes, but they may contain a packing material, such as inert balls, or catalyst particles, or both. If catalyst particles compose at least a portion of the packing material in the vapor passageways, they can be used to further react the vapor phase reactants. The packing material and/or catalyst particles in the vapor passageways can be of a different size than the catalyst particles in the catalyst beds of the reaction zones. Such packing may help to improve the bypassing characteristics of said tubes. It is also within the scope of the present invention that one or more co-current reaction zones be located upstream of one or more counter-current reaction zones. The co-current/countercurrent zones can be in separate vessels or in the same vessel. It is preferred that all countercurrent zones be in the same vessel.

Feedstocks treated by the practice of the present invention will most likely contain undesirable heteroatoms, such as sulfur and nitrogen. In such cases, it will often be preferred that one or more co-current reaction zones be upstream of the first countercurrent reaction zone. That is, it may be preferred that the upstream co-current reaction zone be one in which both a hydrogen-containing treat gas and the feed stream flow downward through a fixed-bed of suitable hydrotreating catalyst. The term "hydrotreating" as used herein refers to processes wherein a hydrogen-containing treat gas is used in the presence of a catalyst which is primarily active for the removal of heteroatoms, such as sulfur, and nitrogen with some hydrogenation of aromatics. The term "hydroprocessing" includes hydrotreating, but also includes processes which are primarily active toward the hydrogenation, hydrocracking, and hydroisomerization. Ring-opening, particularly of naphthenic rings, for purposes of this invention can also be included in the term "hydroprocessing". Suitable hydrotreating catalysts for use in the present invention are any conventional hydrotreating catalyst and includes those which are comprised of at least one Group VIII metal, preferably Fe, Co and Ni, more preferably Co and/or Ni, and most preferably Co; and at least one Group VI metal, preferably Mo and W, more preferably Mo, on a high surface area support material, preferably alumina. Other suitable hydrotreating catalysts include zeolitic catalysts, as well as noble metal catalysts where the noble metal is selected from Pd and Pt. It is within the scope of the present invention that more than one type of hydrotreating catalyst be used in the same reaction vessel. The Group VIII metal is typically present in an amount ranging from about 2 to 20 wt. %, preferably from about 4 to 12%. The Group VI metal will typically be present in an amount ranging from about 5 to 50 wt. %, preferably from about 10 to 40 wt. %, and more preferably from about 20 to 30 wt. %. All metals weight percents are on support. By "on support" we mean that the percents are based on the weight of the support. For example, if the support were to weigh 100 g. then 20 wt. % Group VIII metal would mean that 20 g. of Group VIII metal was on the support. Typical hydrotreating temperatures range from about 100° C. to about 400° C. with pressures from about 50 psig to about 3,000 psig, preferably from about 50 psig to about 2,500 psig. If the feedstock contains relatively low levels of heteroatoms, then the co-current hydrotreating step may be eliminated and the feedstock passed directly to an aromatic saturation, hydrocracking, and/or ring-opening reaction zone.

For purposes of hydroprocessing, the term "hydrogen-containing treat gas" means a treat gas stream containing at least an effective amount of hydrogen for the intended reaction. The treat gas stream introduced to the reaction vessel will preferably contain at least about 50 vol. %, more preferably at least about 75 vol. % hydrogen. It is preferred that the hydrogen-containing treat gas be make-up hydrogen-rich gas, preferably hydrogen.

The liquid phase in the reaction vessels used in the present invention will typically be the higher boiling point components of the feed. The vapor phase will typically be a mixture of hydrogen-containing treat gas, heteroatom impurities, and vaporized lower-boiling components in the fresh feed, as well as light products of hydroprocessing reactions. If the vapor phase effluent still requires further hydroprocessing, it can be passed to a vapor phase reaction zone containing additional hydroprocessing catalyst and subjected to suitable hydroprocessing conditions for further reaction. It is to be understood that all reaction zones can either be in the same vessel separated by non-reaction zones, or any can be in separate vessels. The non-reaction zones in the later case, can be the transfer lines containing gas-liquid contacting material leading from one vessel to another. It is also within the scope of the present invention that a feedstock which already contains adequately low levels of heteroatoms be fed directly into a countercurrent hydroprocessing reaction zone for aromatic saturation and/or cracking. If a preprocessing step is performed to reduce the level of heteroatoms, the vapor and liquid can be disengaged and the liquid effluent directed to the top of a countercurrent reaction vessel. The vapor from the preprocessing step can be processed separately or combined with the vapor phase product from the reaction vessel of the present invention. The vapor phase product(s) may undergo further vapor phase hydroprocessing if greater reduction in heteroatom and aromatic species is desired or sent directly to a recovery system.

As previously stated, the countercurrent contacting of liquid and the treat gas in the contacting zone strips dissolved gaseous impurities, such as $H_2S$ and $NH_3$ from the effluent stream, thereby improving both the hydrogen partial pressure and the catalyst performance. The resulting final liquid product will contain a substantially lower level of heteroatoms than the original feedstock. This liquid product stream may be sent to downstream hydroprocessing or conversion processes.

What is claimed is:

1. A reactor for reacting liquid petroleum and chemical streams with a hydrogen-containing treat gas in the presence of a catalyst in at least one countercurrent reaction zone, which reactor comprises:
   (a) a continuous wall enclosing a countercurrent first reaction zone, wherein said first reaction zone includes a bed of the catalyst, and wherein there is a first non-reaction zone immediately upstream of said first reaction zone and at least a second non-reaction zone downstream of said first reaction zone;
   (b) a gas-liquid contacting zone within each of said non-reaction zones, which gas-liquid contacting zone contains a contacting means comprised of open-structure solid material;

(c) liquid inlet means upstream of said first non-reaction zone of said first reaction zone for allowing an unreacted portion of said liquid stream to enter said reactor;

(d) gas inlet means downstream of said first reaction zone for allowing an unreacted portion of treat gas to enter the reactor;

(e) liquid outlet means downstream of said first reaction zone for allowing a reacted portion of said liquid stream to exit said reactor;

(f) gas outlet means upstream of said first non-reaction zone of said first reaction zone for allowing a reacted portion of said treat gas to exit said reactor; and (g) first gas bypass means in said first reaction zone for allowing at least a portion of the treat gas to bypass said first reaction zone.

2. The reaction vessel of claim 1 further comprising a second countercurrent reaction zone, the second reaction zone being immediately downstream of the second non-reaction zone, and having second gas bypass means for bypassing at least a portion of the treat gas from a third non-reaction zone immediately downstream of the second reaction zone to the second non-reaction zone.

3. The reaction vessel of claim 2 wherein the open-structure solid material is selected from Raschig rings, Intalox saddles, Pall rings, Berl saddles, Cyclohelix spiral rings, Lessing rings, and Cross-partition rings.

4. The reaction vessel of claim 3 wherein the first and second gas bypass means are tubes.

5. The reaction vessel of claim 4 wherein said at least one of the first and second gas bypass which is located external to at least one reaction zone contains at means for adjusting the quantity of vapor flow through said at least one vapor passageway means.

6. The reaction vessel of claim 1 wherein the open-structure solid material is selected from Raschig rings, Intalox saddles, Pall rings, Berl saddles, Cyclohelix spiral rings, Lessing rings, and Cross-partition rings.

7. The reaction vessel of claim 1 wherein the first gas bypass means are tubes.

8. The reaction vessel of claim 1 wherein at least one of the first and second gas bypass means is located external to at least one countercurrent reaction zone.

9. The reaction vessel of claim 1 wherein at least one of the first and second gas bypass means bypasses two or more consecutive reaction zones.

* * * * *